(12) United States Patent
Hirata et al.

(10) Patent No.: US 10,641,277 B2
(45) Date of Patent: May 5, 2020

(54) GAS SEAL STRUCTURE AND CENTRIFUGAL COMPRESSOR

(71) Applicant: MITSUBISHI HEAVY INDUSTRIES COMPRESSOR CORPORATION, Tokyo (JP)

(72) Inventors: Daisuke Hirata, Hiroshima (JP); Takashi Oda, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 140 days.

(21) Appl. No.: 15/768,923

(22) PCT Filed: Dec. 17, 2015

(86) PCT No.: PCT/JP2015/006295
§ 371 (c)(1),
(2) Date: Apr. 17, 2018

(87) PCT Pub. No.: WO2017/103960
PCT Pub. Date: Jun. 22, 2017

(65) Prior Publication Data
US 2019/0072100 A1    Mar. 7, 2019

(51) Int. Cl.
| | |
|---|---|
| F04D 29/08 | (2006.01) |
| F16J 3/04 | (2006.01) |
| F16J 15/06 | (2006.01) |
| F04B 39/00 | (2006.01) |
| F16L 51/02 | (2006.01) |
| F16J 15/52 | (2006.01) |
| F04D 17/10 | (2006.01) |

(52) U.S. Cl.
CPC ............ *F04D 29/083* (2013.01); *F04B 39/00* (2013.01); *F04D 17/10* (2013.01); *F04D 29/08* (2013.01);
(Continued)

(58) Field of Classification Search
CPC ...... F04D 29/083; F04D 29/10; F04D 29/102; F04D 29/104; F04D 17/10; F04D 17/12;
(Continued)

(56) References Cited

U.S. PATENT DOCUMENTS 5,407,237 A * 4/1995 Smolowitz ................ F01D 9/06
285/114
5,806,899 A * 9/1998 Norikawa ........... F01N 13/1816
285/299
(Continued)

FOREIGN PATENT DOCUMENTS

| DE | 19632786 A1 | 2/1998 |
|---|---|---|
| EP | 2405102 A1 | 1/2012 |

(Continued)

OTHER PUBLICATIONS

Extended European Search Report issued in corresponding European Application No. 15910652.5 dated Sep. 13, 2018(6 pages).

*Primary Examiner* — Kenneth J Hansen
*Assistant Examiner* — Jackson N Gillenwaters
(74) *Attorney, Agent, or Firm* — Osha Liang LLP

(57) ABSTRACT

A gas seal structure includes: a first member with a first flow path where seal gas flows; a second member that is disposed to face the first member and includes a second flow path where the seal gas flowing from the first flow path flows toward a predetermined seal surface; and a communicating pipe disposed across the first and second flow paths. The communicating pipe includes: a first pipe end and a first seal member that are held within the first flow path, a second pipe end and a second seal member that are held within the second flow path, and a flexible pipe that connects the first pipe end and the second pipe end. A rigidity of the flexible pipe end is lower than a rigidity of each of the first pipe end and the second pipe end.

8 Claims, 3 Drawing Sheets

(52) U.S. Cl.
    CPC ............... *F16J 3/048* (2013.01); *F16J 15/06* (2013.01); *F16J 15/52* (2013.01); *F16L 51/025* (2013.01)

(58) Field of Classification Search
    CPC .. F16J 15/164; F16J 15/52; F16J 3/048; F16L 51/025; F16L 27/103; F16L 27/1004; F16L 27/111; F16L 27/11
    See application file for complete search history.

(56) References Cited

U.S. PATENT DOCUMENTS

| | | | | |
|---|---|---|---|---|
| 5,845,946 | A | * | 12/1998 | Thomas ............... F16L 25/0036 285/348 |
| 6,007,252 | A | | 12/1999 | Thelen et al. |
| 6,565,311 | B2 | * | 5/2003 | Oya ........................ F01D 9/065 415/115 |
| 9,746,119 | B2 | * | 8/2017 | Hagiya ................. F16L 27/108 |
| 9,927,053 | B2 | * | 3/2018 | Conrad ................... F16L 27/11 |
| 2009/0309355 | A1 | * | 12/2009 | Turfait ................ F01N 13/1816 285/145.5 |
| 2012/0321450 | A1 | | 12/2012 | Aschenbruck et al. |
| 2017/0184130 | A1 | * | 6/2017 | Bertoneri ............. F04D 29/104 |
| 2017/0335966 | A1 | * | 11/2017 | Werdecker ............ F04D 29/128 |

FOREIGN PATENT DOCUMENTS

| | | |
|---|---|---|
| JP | 2008-138577 A | 6/2008 |
| WO | 2005106210 A1 | 11/2005 |

\* cited by examiner

GAS SEAL STRUCTURE AND CENTRIFUGAL COMPRESSOR

TECHNICAL FIELD

The present invention relates to a centrifugal compressor adopting a gas seal.

BACKGROUND

For example, as disclosed in Patent Literature 1, a centrifugal compressor including a casing that bears a shaft including a plurality of stages of impellers with a radial bearing in between, and includes a suction port sucking working fluid at one end part of the shaft in a longitudinal direction, is known.

The centrifugal compressor disclosed in Patent Literature 1 is directed to prevention of occurrence of burn-in at a portion between the shaft and the radial bearing when ethylene gas at low temperature, for example, −60° C. or lower is compressed. In other words, when the working fluid at low temperature is used, thermal contraction occurs on the casing, in particular, at the one end part of the casing including the suction port, and the thermal contraction makes it difficult to maintain an appropriate value of a clearance between the shaft and the radial bearing. Patent Literature 1 proposes provision of a groove that extends along the longitudinal direction of the shaft in a region that is located at the one end part of the casing and is located on outside of the bearing in a radial direction in order to address the thermal contraction difference.

As disclosed in Patent Literature 1, a non-contact gas seal that is excellent in sealing property and has favorable maintainability is often adopted as a shaft-sealing device to the centrifugal compressor. The gas seal supplies high-pressure seal gas to a fine clearance between seal surfaces to seal a periphery of the shaft, namely, provides shaft-sealing. The gas seal may be applied singularly or combined with a labyrinth seal in some cases.

Patent Literature

Patent Literature 1: JP 2008-138577 A

The seal gas is supplied between the seal surfaces through a flow path of the seal gas provided in the casing and a flow path of the seal gas provided in a member that is called seal cartridge or gas seal held by the casing. To prevent the seal gas from being leaked from a boundary between the flow path of the casing side and the flow path of the seal cartridge side, a communicating pipe straddling a connection portion is provided to cause the seal gas to flow inside the communicating pipe.

Depending on an operation condition and a property of the working fluid in addition to the compression of ethylene gas, considerable temperature difference of, for example, about 100° C. may occur between the casing and the seal cartridge, which causes large difference between thermal expansion of the casing and thermal expansion of the seal cartridge. In particular, if difference of the thermal expansion in a rotation axis direction of the impellers is large, the casing and the seal cartridge are mutually shifted in position. As a result, shearing stress along a radial direction of the communicating pipe that is provided across the casing and the seal cartridge, is applied to the communicating pipe and the communicating pipe accordingly deforms. This causes a gap between the communicating pipe and both of the casing and the seal cartridge even if a seal member such as an O-ring is provided, and the seal gas passes through the gap, to be leaked to outside from a boundary between the casing and the seal cartridge. Accordingly, it is not possible to supply the originally-required seal gas to the seal surfaces.

SUMMARY

One or more embodiments of the present invention provide a gas seal structure that makes it possible to prevent leakage of seal gas even if shearing stress is applied to piping that is provided across two members.

In addition, one or more embodiments of the present invention provide a centrifugal compressor including such a gas seal structure.

A gas seal structure according to one or more embodiments of the present invention includes: a first member that includes a first flow path through which supplied seal gas flows; a second member that includes a second flow path through which the seal gas flowing from the first flow path flows toward predetermined a seal surface, and is provided to face the first member; and a communicating pipe that is provided across the first flow path and the second flow path, and through which the seal gas flows from the first flow path toward the second flow path.

In the gas seal structure according to one or more embodiments of the present invention, the communicating pipe includes a first pipe end held by the first flow path with a first seal member in between, a second pipe end held by the second flow path with a second seal member in between, and a flexible pipe that connects the first pipe end and the second pipe end and has rigidity lower than rigidity of each of the first pipe end and the second pipe end.

In the gas seal structure according to one or more embodiments of the present invention, the communicating pipe is made of a metal material or a resin material, and the flexible pipe includes a bellows pipe.

In the gas seal structure according to one or more embodiments of the present invention, when the first flow path of the first member and the second flow path of the second member are shifted in position, the flexible pipe deforms following the positional shift, and the first pipe end and the second pipe end are maintained in the held state before occurrence of the positional shift even when the positional shift occurs.

The gas seal structure described above is applicable to various applications, and is particularly applicable to a centrifugal compressor.

The centrifugal compressor includes: an impeller fixed to a shaft; a casing configured to form a diffuser on an outer periphery of the impeller; and a seal cartridge configured to provide shaft-sealing between the casing and the shaft. The casing includes a first flow path through which supplied seal gas flows, the seal cartridge includes a second flow path through which the seal gas flowing from the first flow path flows toward a predetermined seal surface of the shaft, and a communicating pipe through which the seal gas flows from the first flow path toward the second flow path, is provided across the first flow path and the second flow path.

In the centrifugal compressor according to one or more embodiments of the present invention, the communicating pipe includes a first pipe end held by the first flow path with a first seal member in between, a second pipe end held by the second flow path with a second seal member in between, and a flexible pipe that connects the first pipe end and the second pipe end and has rigidity lower than rigidity of each of the first pipe end and the second pipe end.

In the centrifugal compressor according to one or more embodiments of the present invention, the communicating pipe is preferably made of a metal material or a resin material, and the flexible pipe includes a bellows pipe.

In the centrifugal compressor according to one or more embodiments of the present invention, when the first flow path of the casing and the second flow path of the seal cartridge are shifted in position, the flexible pipe deforms following the positional shift, and the first pipe end and the second pipe end are maintained in the held state before occurrence of the positional shift even when the positional shift occurs.

Advantageous Effects of Invention

According to the gas seal structure according to one or more embodiments of the present invention, the communicating pipe includes the first pipe end held by the first flow path with the first seal member in between, the second pipe end held by the second flow path with the second seal member in between, and the flexible pipe that connects the first pipe end and the second pipe end and has rigidity lower than rigidity of each of the first pipe end and the second pipe end. Therefore, even if positional shift occurs between the first member and the second member, the flexible pipe can deform and incline following the positional shift. In addition, since the first pipe end and the second pipe end are displaced following the positional shift, it is possible to secure sealing between the first pipe end and the first flow path by the first seal member at the first pipe end and sealing between the second pipe end and the second flow path by the second seal member at the second pipe end even if the positional shift occurs. Consequently, the invention of the present application makes it possible to prevent leakage of the seal gas even if shearing stress caused by the positional shift is applied to the communicating pipe.

DETAILED DESCRIPTION

A centrifugal compressor according to one or more embodiments of the present invention is described below with reference to FIG. 1 to FIG. 3C.

Figure 1:
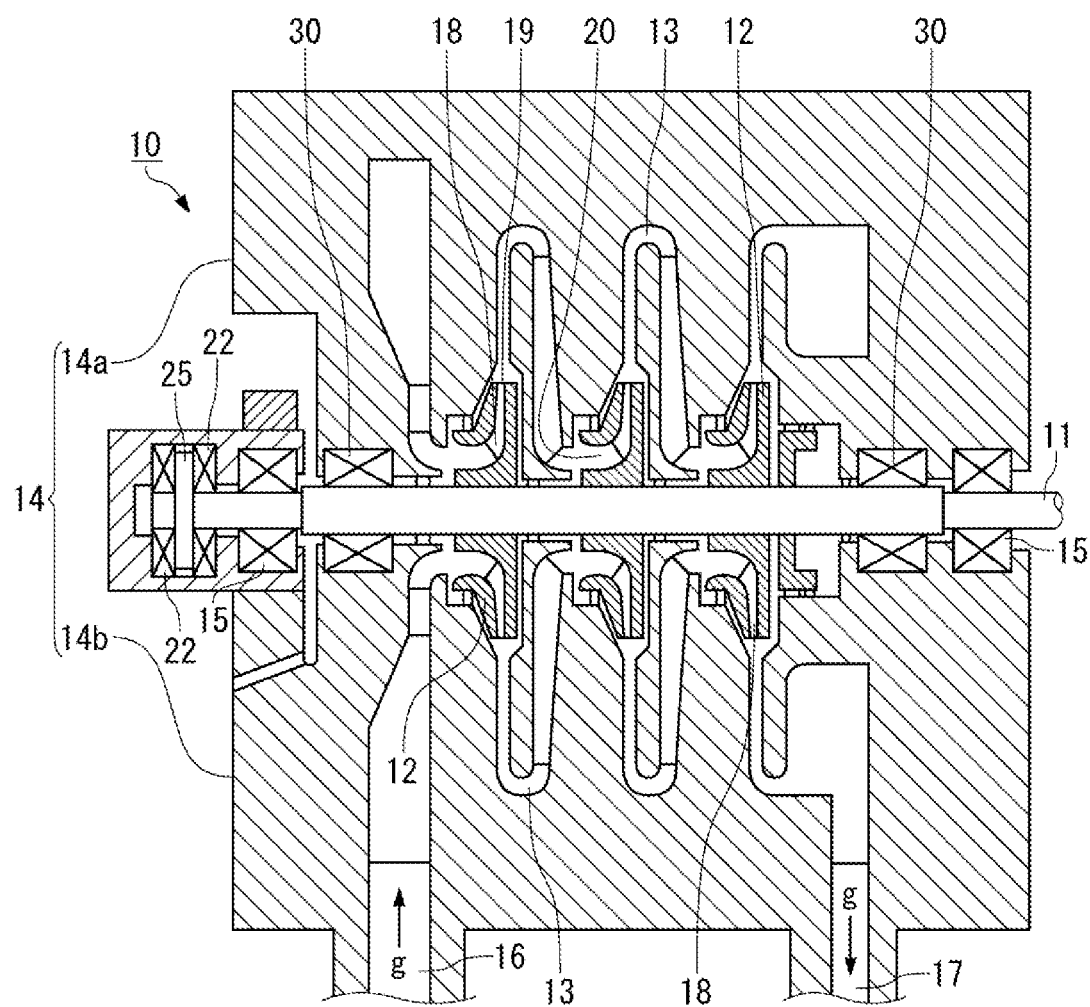
FIG. 1 is a cross-sectional view illustrating a schematic configuration of an entire centrifugal compressor according to one or more embodiments of the present invention.

As illustrated in FIG. 1, a centrifugal compressor 10 according to one or more embodiments of the present embodiment includes a plurality of stages of impellers 12, a casing (first member) 14, and a journal bearing 15. The plurality of stages is three stages in one or more embodiments, and the three stages of impellers 12 are fixed to a shaft 11 serving as a rotary shaft. The casing 14 forms a diffuser 13 on outer peripheries of the respective impellers 12. The journal bearing 15 is provided between the casing 14 and the shaft 11.

Note that the centrifugal compressor 10 according to one or more embodiments is of a horizontal shaft type in which the shaft 11 is disposed in a horizontal direction and of a horizontally split type in which the casing 14 is split in the horizontal direction.

The centrifugal compressor 10 compresses gas g as working fluid that has been sucked from a suction port 16, and discharges the compressed gas g. In other words, the gas g sucked from the suction port 16 is provided with centrifugal force by rotation of the impellers 12, and is increased in speed and pressure and is then fed to the diffuser 13, thereby being compressed according to variation of flow path area of the diffuser 13. The gas g is further compressed every time passing through the impellers 12 of the respective stages, and the compressed gas g is discharged as high-pressure gas from a discharge port 17.

Each of the impellers 12 is a disk having a plurality of blades, and an impeller flow path 18 is formed between the blades. The gas g that has entered the impeller flow path 18 from center side is provided with centrifugal force by the rotation of the impellers 12, is increased in speed and pressure and is discharged from outer peripheral side, thereby being fed to the diffuser 13.

The diffuser 13 is a device that reduces the speed of the gas g passing therethrough by varying cross-sectional area of the flow path, and increases pressure. The diffuser 13 forms a flow path that feeds the gas g flowing out from the impeller flow path 18 into an inlet of the impeller flow path 18 of the latter stage. Further, as illustrated in FIG. 1, the diffuser 13 is formed so as to be directed from an outlet 19 of the impeller flow path 18 to an outward in the radial direction, be bent at an outermost periphery, then return to an inward in the radial direction, and communicate with an inlet 20 of the impeller flow path 18, because the impeller 12 are continuously provided in the axis direction.

The shaft 11 that rotatably supports the impellers 12 is supported by a seal cartridge (second member) 30 at both end parts, and is attached to the casing 14. The seal cartridge 30 provides shaft-sealing between the casing 14 and the shaft 11. Further, one end part (left end part in FIG. 1) of the shaft 11 is also supported by paired thrust bearings 22 that are provided to sandwich a thrust collar 25. As illustrated in FIG. 1, the casing 14 includes an upper casing 14a and a lower casing 14b. The seal cartridge 30 faces the upper casing 14a and the lower casing 14b, and is held by the upper casing 14a and the lower casing 14b.

Figure 2A:
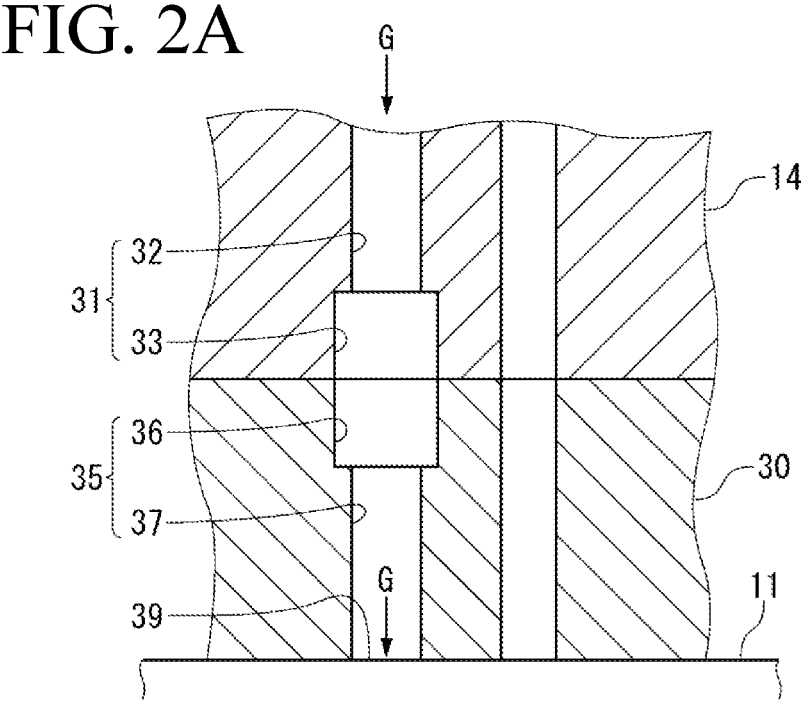
FIGS. 2A and 2B are enlarged cross-sectional views illustrating a gas seal structure of the centrifugal compressor of FIG. 1.
Figure 2B:
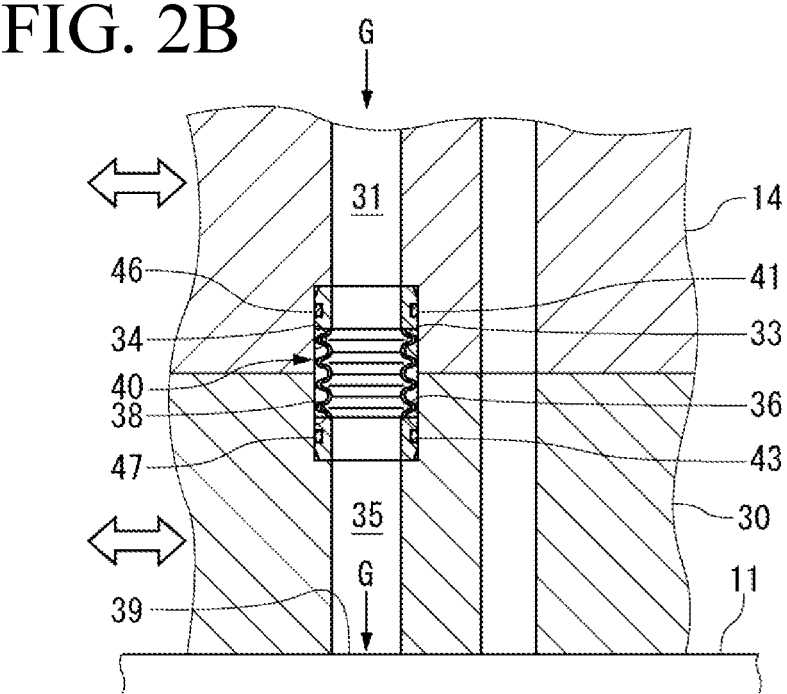

FIGS. 2A and 2B illustrate a boundary between the casing 14 and the seal cartridge 30.

As illustrated in FIG. 2A, the casing 14 includes a first flow path 31 through which seal gas G supplied from outside flows toward the seal cartridge 30. Note that a direction in which the seal gas G flows is illustrated by a solid arrow. The first flow path 31 includes a main flow path 32 located on upstream side, and a terminal flow path 33 that communicates with the main flow path 32 and is located on downstream side. Each of the main flow path 32 and the terminal flow path 33 includes a circular opening, and a diameter of the opening of the terminal flow path 33 is made larger than a diameter of the opening of the main flow path 32. As illustrated in FIG. 2B, the terminal flow path 33 houses a half of a communicating pipe 40 that is provided across the casing 14 and the seal cartridge 30. Accordingly, the terminal flow path 33 has the opening diameter that allows the communicating pipe 40 to be housed in the terminal flow path 33 with a first seal ring (first seal member) 46 in between without a gap.

Note that, although not illustrated in FIGS. 2A and 2B, other members such as a labyrinth seal may be provided between the seal cartridge 30 and the shaft 11.

The seal cartridge 30 includes a second flow path 35 through which the seal gas G flowing from the first flow path 31 of the casing 14 flows toward a seal surface 39. The second flow path 35 includes a terminal flow path 36 located on upstream side, and a main flow path 37 that communicates with the terminal flow path 36 and is located on downstream side. Each of the main flow path 37 and the terminal flow path 36 includes a circular opening, and a diameter of the opening of the terminal flow path 36 is made larger than a diameter of the opening of the main flow path 37. As illustrated in FIG. 2B, the terminal flow path 36 houses a half of the communicating pipe 40 that is provided across the seal cartridge 30 and the casing 14. Accordingly, the terminal flow path 36 has the opening diameter that allows the communicating pipe 40 to be housed in the terminal flow path 36 with a second seal ring (second seal member) 47 in between without a gap.

The casing 14 and the seal cartridge 30 are assembled to each other such that center axes of the first flow path 31 and the second flow path 35 are coaxial with each other at room temperature. As illustrated in FIG. 2B, a center axis of the communicating pipe 40 is also coaxial with the center axes of the first flow path 31 and the second flow path 35, and the communicating pipe 40 is housed in the terminal flow path 33 and the terminal flow path 36.

Figure 3A:
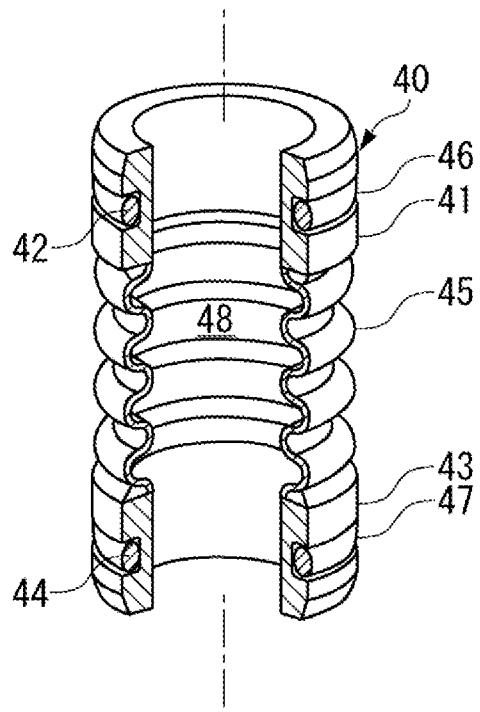
FIGS. 3A to 3C each illustrate a communicating pipe used in the gas seal structure of the centrifugal compressor of FIG. 1, FIG. 3A illustrating an unloaded state, and FIGS. 3B and 3C each illustrating a state where positional shift occurs and shearing stress is applied to the communicating pipe.

As illustrated in FIG. 3A, the communicating pipe 40 includes a first pipe end 41, a second pipe end 43, and a flexible pipe 45. The first pipe end 41 and the second pipe end 43 are disposed with a predetermined distance in between. The flexible pipe 45 connects the first pipe end 41 and the second pipe end 43. The communicating pipe 40 includes a flow path 48 that penetrates through the first pipe end 41, the flexible pipe 45, and the second pipe end 43, and the seal gas G flows through the flow path 48 while the communicating pipe 40 is housed in the terminal flow path 33 and the terminal flow path 36. Each of the first pipe end 41, the second pipe end 43, and the flexible pipe 45 is made of a metal material such as stainless steel.

As illustrated in FIG. 3A, the first pipe end 41 includes a first annular seal holding groove 42 on an outer peripheral surface, and a first seal ring 46 configured of an O-ring is fitted to the first seal holding groove 42. As illustrated in FIG. 2B, the first pipe end 41 is disposed inside the terminal flow path 33. The first seal ring 46 is pressed against an inner wall surface 34 forming the terminal flow path 33, which causes the first pipe end 41 to be held inside the first flow path 31 (terminal flow path 33) of the casing 14.

As with the first pipe end 41, the second pipe end 43 also includes, on an outer peripheral surface, a second annular seal holding groove 44 to which a second seal ring 47 is fitted. As illustrated in FIG. 2B, the second pipe end 43 is disposed inside the terminal flow path 36. The second seal ring 47 is pressed against an inner wall surface 38 forming the terminal flow path 36, which causes the second pipe end 43 to be held inside the second flow path 35 (terminal flow path 36) of the seal cartridge 30.

The first pipe end 41 and the second pipe end 43 are made thick as compared with the flexible pipe 45, and have rigidity to prevent easy deformation of the first pipe end 41 and the second pipe end 43 even if external force is applied thereto while the first pipe end 41 and the second pipe end 43 are respectively fixed inside the terminal flow path 33 and the terminal flow path 36.

The flexible pipe 45 includes a metal bellows pipe, and has low rigidity as compared with the first pipe end 41 and the second pipe end 43. The communicating pipe 40 is fabricated such that the first pipe end 41, the second pipe end 43, and the flexible pipe 45 are coaxial with one another. When the center axes of the first pipe end 41 and the second pipe end 43 are eccentric to each other, however, the flexible pipe 45 can elastically deform following the eccentricity. In particular, the flexible pipe 45 including the bellows pipe does not easily plastically deform. Therefore, the flexible pipe 45 has high reliability even if positional shift repeatedly occurs.

Next, action and effects of the communicating pipe 40 in the gas seal structure of one or more embodiments are described.

As illustrated in FIG. 2B, the communicating pipe 40 is housed inside the first flow path 31 of the casing 14 and inside the second flow path 35 of the seal cartridge 30, and the first pipe end 41 is fixed inside the terminal flow path 33 with the first seal ring 46 in between and the second pipe end 43 is fixed inside the terminal flow path 36 with the second seal ring 47 in between.

When temperature difference occurs between the casing 14 and the seal cartridge 30 during operation of the centrifugal compressor 10, relative positional shift in the horizontal direction occurs between the casing 14 and the seal cartridge 30, and shearing stress is applied to the communicating pipe 40. Note that, in FIG. 2B, the relative positional shift is illustrated by a void arrow.

Figure 3B:
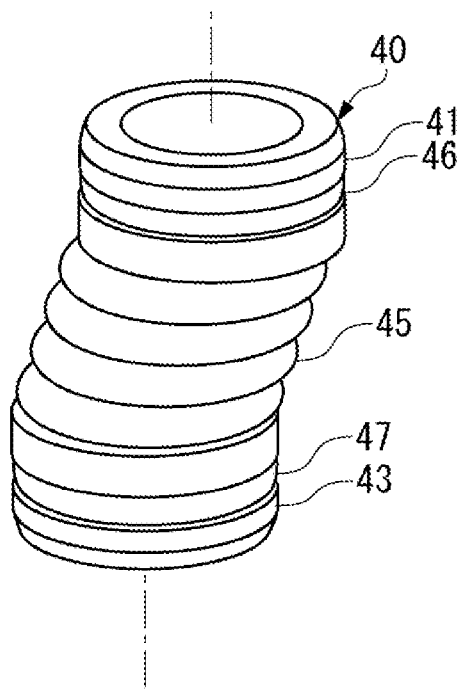
Figure 3C:
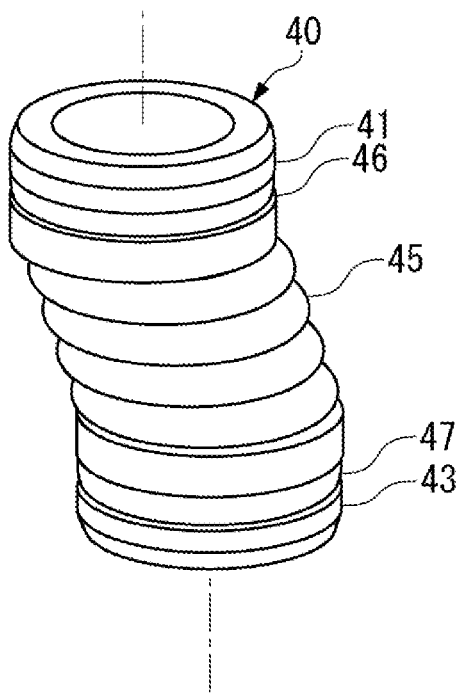

A state of deformation of the communicating pipe 40 when the positional shift occurs is illustrated in FIGS. 3B and 3C. As illustrated in FIGS. 3B and 3C, the flexible pipe 45 can deform and incline following the positional shift.

In contrast, the first pipe end 41 is displaced in the horizontal direction following the positional shift of the casing 14 while maintaining the state of being held inside the terminal flow path 33 before the positional shift occurs, namely, while maintaining the state where the center axis thereof is directed in a vertical direction. Likewise, the second pipe end 43 is displaced in the horizontal direction following the positional shift of the seal cartridge 30 while maintaining the state of being fixed inside the terminal flow path 36 before the positional shift occurs, namely, while maintaining the state where the center axis thereof is directed in the vertical direction. Accordingly, even if the positional shift between the casing 14 and the seal cartridge 30 occurs, it is possible to secure sealing between the first pipe end 41 and the terminal flow path 33 by the first seal ring 46 at the first pipe end 41 and sealing between the second pipe end 43 and the terminal flow path 36 by the second seal ring 47 at the second pipe end 43.

In contrast, for example, if the flexible pipe 45 also has high rigidity similarly to the first pipe end 41 and the second pipe end 43, the first pipe end 41 and the second pipe end 43 may also incline together with the flexible pipe 45 when the positional shift occurs between the casing 14 and the seal cartridge 30. This causes so-called one-sided contact on one or both of the first seal ring 46 and the second seal ring 47, which makes it difficult to perform sealing between the first pipe end 41 and the terminal flow path 33 and sealing between the second pipe end 43 and the terminal flow path 36.

Conversely, if the first pipe end 41 and the second pipe end 43 also have low rigidity, it becomes difficult to secure and maintain force pressing the first seal ring 46 and the second seal ring 47 respectively against the inner wall surface 34 of the terminal flow path 33 and the inner wall surface 38 of the terminal flow path 36. In contrast, since the first pipe end 41 and the second pipe end 43 of the communicating pipe 40 each have high rigidity, it is possible to press the first seal ring 46 and the second seal ring 47 with necessary force.

Although one or more embodiments of the present invention are described above, the configurations of the above-described embodiments may be selected or appropriately modified without departing from the scope of the present invention.

The above-described communicating pipe 40 has been described as an example in which the first pipe end 41, the second pipe end 43, and the flexible pipe 45 are wholly made of a metal material. The communicating pipe of one or more embodiments of the present invention, however, may be wholly made of a resin material, for example, a fluorine resin such as polytetrafluoroethylene (PTFE). Further, a part of the pipe end that requires high rigidity may be made of a metal material such as stainless steel, and a part of the flexible pipe may be made of a resin material such as a fluorine resin.

Moreover, in the communicating pipe 40, the flexible pipe 45 that has low rigidity and connects the paired pipe ends each having relatively high rigidity, includes a bellows pipe; however, the configuration thereof is optional as long as the communicating pipe 40 has rigidity lower than the rigidity of the pipe ends and exerts action and effects similar to those of the bellows pipe described above. For example, the communicating pipe may be formed as a straight pipe in which the flexible pipe has low thickness and low rigidity as compared with the pipe ends. Furthermore, in a case where the flexible pipe is made of a fluorine resin, the flexible pipe may include a bellows pipe or may be made thin and low in rigidity as compared with the pipe ends.

REFERENCE SIGNS LIST

10 Centrifugal compressor
11 Shaft
12 Impeller
13 Diffuser
14 Casing
14a Upper casing
14b Lower casing
15 Journal bearing
16 Suction port
17 Discharge port
18 Impeller flow path
19 Outlet
20 Inlet
22 Thrust bearing
30 Seal cartridge
31 First flow path
32 Main flow path
33 Terminal flow path
34 Inner wall surface
35 Second flow path
36 Terminal flow path
37 Main flow path
38 Inner wall surface
39 Seal surface
40 Communicating pipe
41 First pipe end
42 First seal holding groove
43 Second pipe end
44 Second seal holding groove
45 Flexible pipe
46 First seal ring
47 Second seal ring
48 Flow path
g Gas
G Seal gas Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A gas seal structure, comprising:
 a first member that is fixed to a rotary shaft and includes a first flow path where seal gas flows;
 a second member that:
  includes a second flow path where the seal gas flowing from the first flow path flows toward a predetermined seal surface, and
  is disposed to face the first member so as to provide shaft-sealing between the first member and the second member; and
 a communicating pipe disposed across the first flow path and the second flow path, wherein
 the seal gas flows from the first flow path toward the second flow path through the communicating pipe, and
 the communicating pipe includes:
  a first pipe end and a first seal member that are held within the first flow path,
  a second pipe end and a second seal member that are held within the second flow path, and
  a flexible pipe that connects the first pipe end and the second pipe end, wherein a rigidity of the flexible pipe is lower than a rigidity of each of the first pipe end and the second pipe end, wherein
  the respective first pipe end and second pipe end have the rigidity such that even when a shift in a position of the first flow path of the first member and the second flow path of the second member occurs, the first pipe end and the second pipe end are maintained in a state with respect to a direction of a center axis of each of the first pipe end and second pipe end before an occurrence of the shift in the position.

2. The gas seal structure according to claim 1, wherein the communicating pipe is made of a metal material or a resin material, and
 the flexible pipe includes a bellows pipe.

3. The gas seal structure according to claim 1, wherein in response to the shift in the position of the first flow path and the second flow path, the flexible pipe deforms according to the shift in the position.

4. A centrifugal compressor, comprising:
 an impeller fixed to a shaft;
 a casing that forms a diffuser on an outer periphery of the impeller; and
 a gas seal that provides shaft-sealing between the casing and the shaft, wherein
 the casing includes a first flow path where seal gas flows,
 the gas seal includes a second flow path where the seal gas flowing from the first flow path flows toward a predetermined seal surface of the shaft,
 a communicating pipe is disposed across the first flow path and the second flow path,
 the seal gas flows from the first flow path toward the second flow path through the communicating pipe, and the communicating pipe includes:
  a first pipe end and a first seal member that are held within the first flow path,
  a second pipe end and a second seal member that are held within the second flow path, and
  a flexible pipe that connects the first pipe end and the second pipe end, wherein a rigidity of the flexible pipe is lower than a rigidity of each of the first pipe end and the second pipe end.

5. The centrifugal compressor according to claim 4, wherein
  the communicating pipe is made of a metal material or a resin material, and
  the flexible pipe includes a bellows pipe.

6. The centrifugal compressor according to claim 4, wherein
  in response to a shift in a position of the first flow path and the second flow path, the flexible pipe deforms according to the shift in the position,
  the first pipe end and the second pipe end are maintained in a held state during the shift in the position, and
  the held state is a state of the first pipe end and the second pipe end before an occurrence of the shift in the position.

7. The gas seal structure according to claim 2, wherein
  in response to the shift in the position of the first flow path and the second flow path, the flexible pipe deforms according to the shift in the position.

8. The centrifugal compressor according to claim 5, wherein
  in response to a shift in a position of the first flow path and the second flow path, the flexible pipe deforms according to the shift in the position,
  the first pipe end and the second pipe end are maintained in a held state during the shift in the position, and
  the held state is a state of the first pipe end and the second pipe end before an occurrence of the shift in the position.

\* \* \* \* \*